US010362252B2

(12) United States Patent
Oshima et al.

(10) Patent No.: US 10,362,252 B2
(45) Date of Patent: Jul. 23, 2019

(54) SOLID-STATE IMAGE SENSOR, IMAGE CAPTURING APPARATUS AND CONTROL METHOD THEREOF, AND STORAGE MEDIUM

(71) Applicant: CANON KABUSHIKI KAISHA, Tokyo (JP)

(72) Inventors: Koji Oshima, Yokohama (JP); Nobuhiro Takeda, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 164 days.

(21) Appl. No.: 14/678,265

(22) Filed: Apr. 3, 2015

(65) Prior Publication Data

US 2015/0288903 A1 Oct. 8, 2015

(30) Foreign Application Priority Data

Apr. 7, 2014 (JP) .................................. 2014-078980

(51) Int. Cl.
*H04N 9/04* (2006.01)
*H04N 5/347* (2011.01)
*H04N 5/378* (2011.01)

(52) U.S. Cl.
CPC ............. *H04N 5/378* (2013.01); *H04N 5/347* (2013.01); *H04N 9/045* (2013.01)

(58) Field of Classification Search
CPC ...... H04N 5/378; H04N 5/347; H04N 5/3742; H04N 5/3745; H04N 9/045; H04N 3/155; H01L 27/14601
USPC ........................................................ 348/301
See application file for complete search history.

(56) References Cited

U.S. PATENT DOCUMENTS

| 7,488,928 B2 * | 2/2009 | Krymski | H04N 3/155 250/208.1 |
| 7,554,584 B2 * | 6/2009 | Lim | H04N 5/3575 348/241 |
| 7,719,582 B2 * | 5/2010 | Wada | H04N 9/045 348/179 |

(Continued)

FOREIGN PATENT DOCUMENTS

| JP | 5250474 B2 | 7/2013 |
| JP | 2013-197613 A | 9/2013 |

OTHER PUBLICATIONS

The Mar. 12, 2019 Japanese Office Action, which is inclosed without an English Translation, that issued in Japanese Patent Application No. 2018038940.

*Primary Examiner* — Pritham D Prabhakher
(74) *Attorney, Agent, or Firm* — Cowan, Liebowitz & Latman, P.C.

(57) ABSTRACT

A solid-state image sensor includes a plurality of pixels arrayed in the row direction and the column direction, the first column signal line to which every other pixel arrayed in one pixel column is connected and the second column signal line to which remaining every other pixel arrayed in the one pixel array is connected, a pair of which are arranged for the one pixel column in the one pixel array; and a driver which drives the plurality of pixels arrayed in the one pixel column to simultaneously connect amplification transistors of a least two pixels to a same first column signal line on the same pixel column and simultaneously connect amplification transistors of at least two pixels to a same second column signal line on the same pixel column.

14 Claims, 8 Drawing Sheets

(56) References Cited

U.S. PATENT DOCUMENTS

| | | | |
|---|---|---|---|
| 8,576,979 B2* | 11/2013 | Mo | H04N 5/355 377/108 |
| 8,582,009 B2* | 11/2013 | Kono | H01L 27/14609 348/281 |
| 8,599,284 B2* | 12/2013 | Mo | H04N 5/355 348/218.1 |
| 8,804,020 B2* | 8/2014 | Kobayashi | H04N 5/3765 348/308 |
| 8,809,759 B2* | 8/2014 | Mo | H04N 5/355 250/208.1 |
| 2005/0035927 A1* | 2/2005 | Kimura | H04N 9/045 345/55 |
| 2005/0185075 A1 | 8/2005 | Neter | |
| 2005/0206752 A1* | 9/2005 | Lim | H04N 5/3575 348/241 |
| 2006/0209202 A1* | 9/2006 | Yanai | H04N 5/343 348/311 |
| 2008/0180555 A1* | 7/2008 | Sato | H04N 5/3452 348/248 |
| 2008/0258042 A1* | 10/2008 | Krymski | H04N 3/155 250/208.1 |
| 2009/0219420 A1* | 9/2009 | Kuroda | H04N 5/343 348/281 |
| 2010/0002114 A1* | 1/2010 | Ogura | H04N 5/378 348/301 |
| 2012/0050560 A1* | 3/2012 | Kobayashi | H04N 5/3742 348/222.1 |
| 2012/0050593 A1* | 3/2012 | Kobayashi | H04N 5/3742 348/302 |
| 2013/0087683 A1* | 4/2013 | Mo | H04N 5/355 250/208.1 |
| 2013/0088624 A1* | 4/2013 | Mo | H04N 5/355 348/300 |
| 2013/0089175 A1* | 4/2013 | Mo | H04N 5/355 377/49 |
| 2013/0181116 A1* | 7/2013 | Matsuda | H04N 5/3742 250/208.1 |
| 2013/0182163 A1* | 7/2013 | Kobayashi | H01L 27/14601 348/302 |
| 2013/0201383 A1* | 8/2013 | Okado | G02B 7/34 348/345 |

* cited by examiner

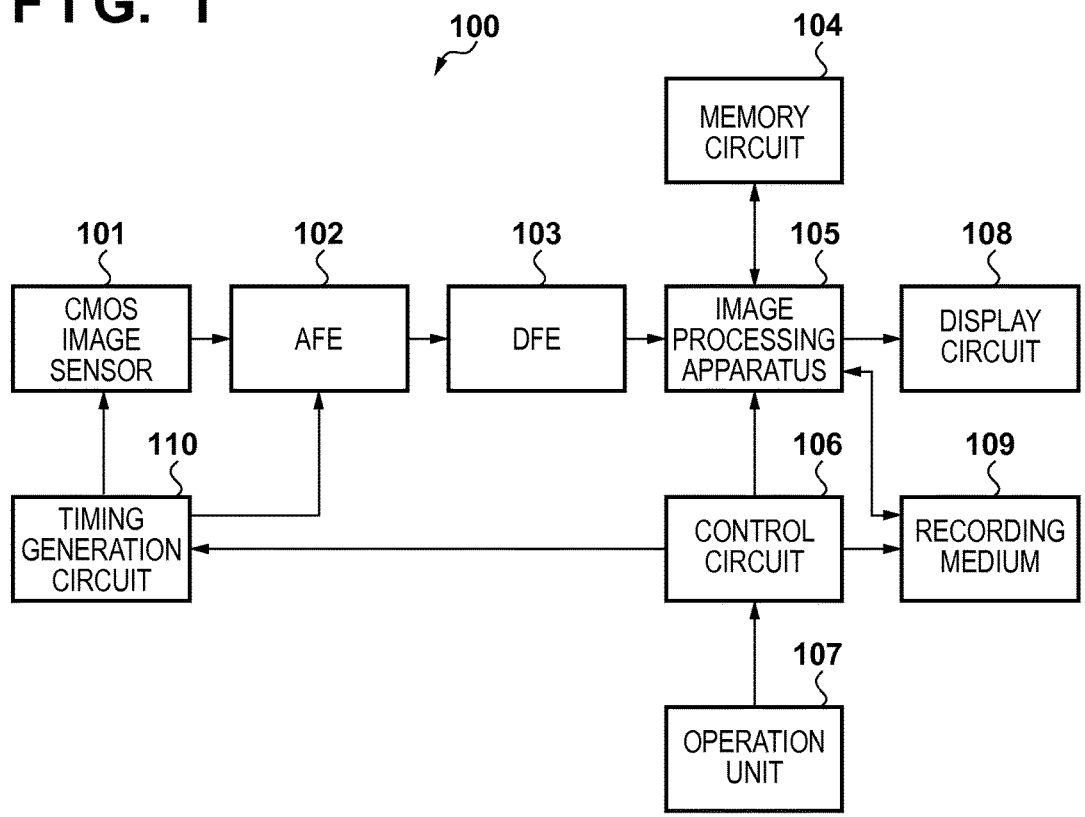
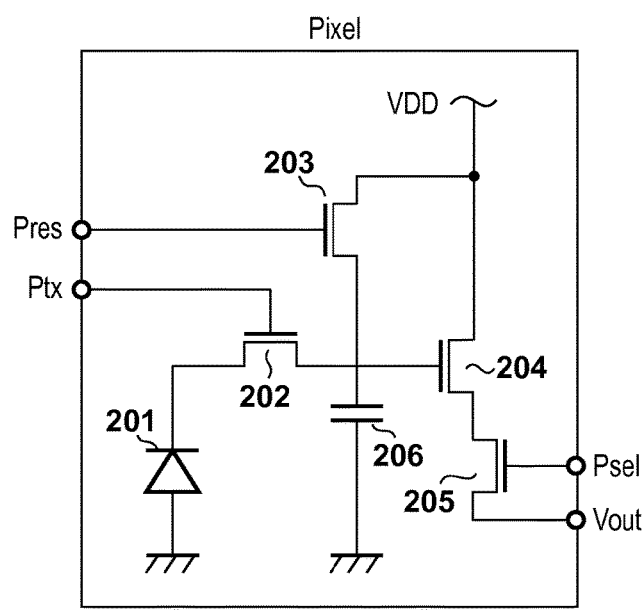

|   | 1 | 2 | 3 | 4 | 5 | 6 |
|---|---|---|---|---|---|---|
| 1 | R | G | R | G | R | G |
| 2 | G | B | G | B | G | B |
| 3 | R | G | R | G | R | G |
| 4 | G | B | G | B | G | B |
| 5 | R | G | R | G | R | G |
| 6 | G | B | G | B | G | B |
| 7 | R | G | R | G | R | G |
| 8 | G | B | G | B | G | B |

SOLID-STATE IMAGE SENSOR, IMAGE CAPTURING APPARATUS AND CONTROL METHOD THEREOF, AND STORAGE MEDIUM

BACKGROUND OF THE INVENTION

Field of the Invention

The present invention relates to a solid-state image sensor and an image capturing apparatus.

Description of the Related Art

Recently, in an image capturing apparatus such as a digital camera, it is general that a CMOS image sensor is used for a solid-state image sensor, and image capturing for both a still image and a moving image is possible. While the number of pixels and image information amount of this CMOS image sensor are increasing, a user wants speedup in a readout operation which allows high-speed continuous shooting and a high frame rate in the moving image capturing.

In the moving image capturing, there are a live view mode in which the image is displayed on a liquid crystal screen and respective moving image formats such as HD, 4K, and 2K. When a pixel signal is read out as image information, the number of pixels needs to be reduced to the number corresponding to each format. At this time, if a method by thinning processing of reducing the number of pixels by skipping pixels in a certain cycle is used, it leads to deterioration in image quality such as the occurrence of moire. To cope with this, Japanese Patent No. 5250474 discloses a technique of performing pixel output mixture processing (averaging) in an image sensor and reading out the pixels at a high speed as a method of reading out the reduced number of pixels as a necessary information amount without losing the resolution of the image.

Japanese Patent No. 5250474 adopts an arrangement in which when mixing and then reading out pixel outputs, a plurality of rows whose pixel outputs are mixed are selected simultaneously, pixel signals on the same column are output on the same vertical signal line simultaneously, and the signals are mixed on the vertical signal line, thereby reading out the signals as the signals obtained by mixing the pixel outputs. This makes it possible, when reading out the mixed pixel outputs, to read out the pixel outputs at a high speed without providing a capacitor or the like separately.

In Japanese Patent No. 5250474, however, since there is only one vertical signal line for the pixel signals on the same column, mixture of the pixel outputs with respect to the same column is performed in the one vertical signal line. That is, it is necessary to sequentially read out the pixel signals on the same column from the one vertical signal line, and the pixel signals on one row need to be read out by temporary holding the readout pixel signals in a holding capacitor provided for each column and then performing horizontal transferring of the pixel signals sequentially. For this reason, the next row cannot be read out until a readout operation for one row is completed, thus taking a considerable time for the readout operation.

SUMMARY OF THE INVENTION

The present invention has been made in consideration of the above-described problems and reduces a total readout period from the mixture processing to horizontal transferring of pixel outputs while suppressing an increase in a circuit scale.

According to the first aspect of the present invention, there is provided a solid-state image sensor comprising: a pixel array in which a plurality of pixels each including a photoelectric conversion portion and an amplification transistor configured to amplify a signal corresponding to charges generated in the photoelectric conversion portion are arrayed in a row direction and a column direction; a first column signal line to which every other pixel arrayed in one pixel column is connected and a second column signal line to which remaining every other pixel arrayed in the one pixel column is connected, a pair of which are arranged for the one pixel column in the pixel array; and a driving unit configured to drive the plurality of pixels to simultaneously connect amplification transistors of at least the two pixels onto the same column signal line out of one of the first column signal line and the second column signal line on the same pixel column, and to drive the plurality of pixels to perform signal output to the first column signal line and signal output to the second column signal line in parallel when a mode of performing pixel mixture and reading out signals of the pixels is set.

According to the second aspect of the present invention, there is provided an image capturing apparatus comprising: a solid-state image sensor including a pixel array in which a plurality of pixels each including a photoelectric conversion portion and an amplification transistor configured to amplify a signal corresponding to charges generated in the photoelectric conversion portion are arrayed in a row direction and a column direction, and a first column signal line to which every other pixel arrayed in one pixel column is connected and a second column signal line to which remaining every other pixel arrayed in the one pixel column is connected, a pair of which are arranged for the one pixel column in the pixel array; a setting unit configured to set an image capturing mode; and a control unit configured to drive the plurality of pixels to simultaneously connect amplification transistors of at least the two pixels onto the same column signal line out of one of the first column signal line and the second column signal line on the same pixel column, and to drive the plurality of pixels to perform signal output to the first column signal line and signal output to the second column signal line in parallel when the setting unit sets a mode of performing pixel mixture and reading out signals of the pixels.

According to the third aspect of the present invention, there is provided a control method of an image capturing apparatus including a solid-state image sensor including a pixel array in which a plurality of pixels each including a photoelectric conversion portion and an amplification transistor configured to amplify a signal corresponding to charges generated in the photoelectric conversion portion are arrayed in a row direction and a column direction, and a first column signal line to which every other pixel arrayed in one pixel column is connected and a second column signal line to which remaining every other pixel arrayed in the one pixel column is connected, a pair of which are arranged for the one pixel column in the pixel array, and a setting unit configured to set an image capturing mode, the method comprising: a control step of driving the plurality of pixels to simultaneously connect amplification transistors of at least the two pixels onto the same column signal line out of one of the first column signal line and the second column signal line on the same pixel column, and driving the plurality of pixels to perform signal output to the first column signal line and signal output to the second column signal line in parallel when the setting unit sets a mode of performing pixel mixture and reading out signals of the pixels.

Further features of the present invention will become apparent from the following description of exemplary embodiments with reference to the attached drawings.

BRIEF DESCRIPTION OF THE DRAWINGS

FIG. 1 is a block diagram showing an image capturing apparatus according to the first embodiment of the present invention;

FIG. 2 is a view showing the arrangement of a pixel portion of a solid-state image sensor according to the first embodiment;

DESCRIPTION OF THE EMBODIMENTS

Figure 3:
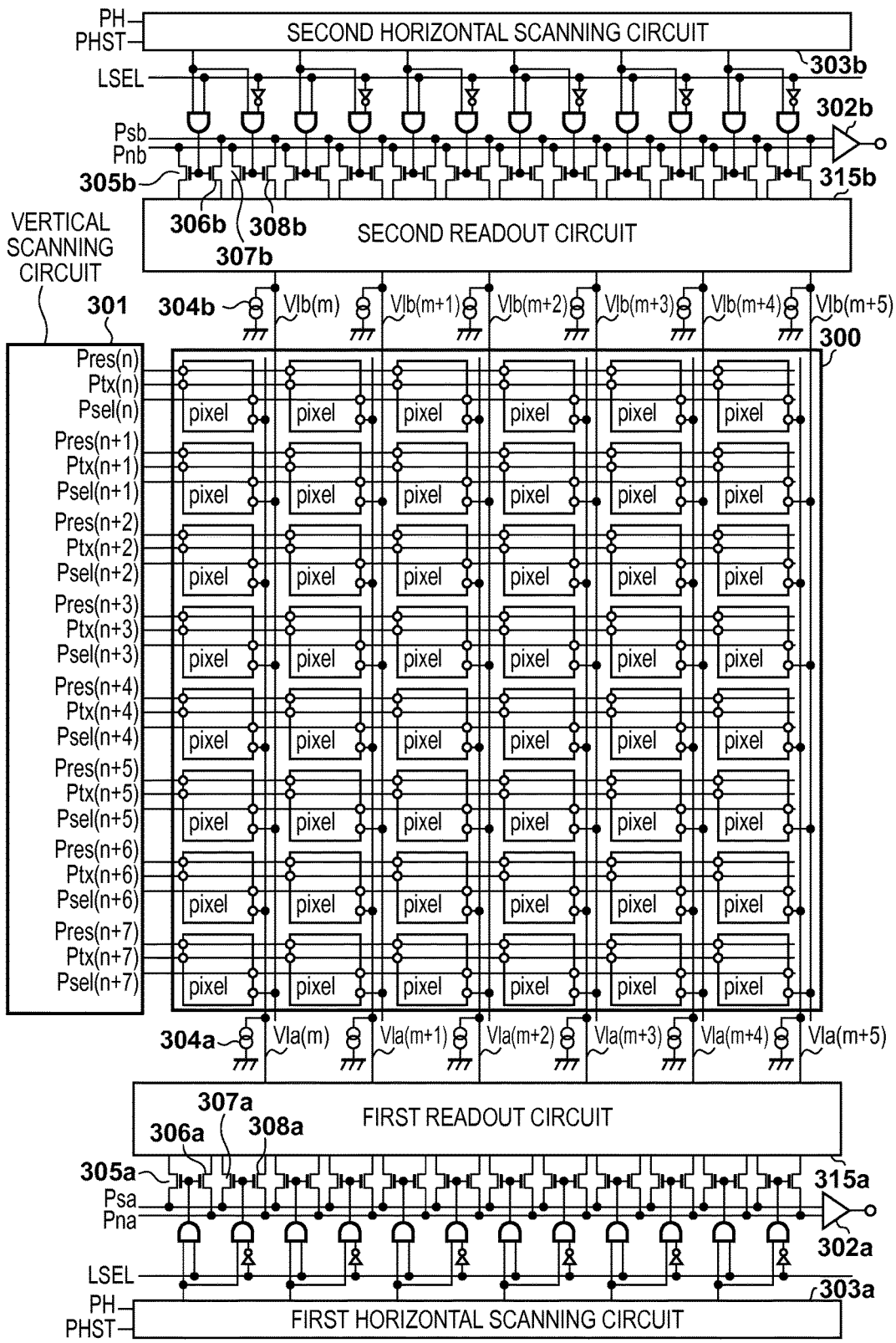
FIG. 3 is a view showing the arrangement of the solid-state image sensor according to the first embodiment.

The embodiments of the present invention will be described below in detail with reference to the accompanying drawings.

(First Embodiment)

FIG. 1 is an overall block diagram showing the arrangement of an image capturing apparatus 100 according to the first embodiment of the present invention. Referring to FIG. 1, an image sensor 101 is a CMOS image sensor and photoelectrically converts an object image formed by an image capturing lens (not shown). AFE (Analog Front End) 102 is a signal processing circuit which performs, for example, amplification of a signal from the image sensor 101 and reference level adjustment (clamp processing). An analog signal which has undergone the above-described processing is converted into a digital signal.

A DFE (Digital Front End) 103 performs, for example, digital processing such as various correction processes of a digital image signal of each pixel converted by the AFE 102 and a pixel rearrangement. An image processing apparatus 105 performs processing of performing a development process and displaying an image in a display circuit 108 or recording the image on a recording medium 109 via a control circuit 106.

The control circuit 106 also performs, for example, control of sending a command to a timing generation circuit 110 based on an instruction by a user from an operation unit 107 and information stored in a memory circuit 104. The memory circuit 104 is also used as a work memory of the image processing apparatus 105 in a development stage or as a buffer memory for continuous image capturing or the like.

The operation unit 107 includes a power supply switch for activating a digital camera. The operation unit 107 also includes, for example, a shutter switch which instructs the start of an image capturing preparation operation such as photometry processing or distance measurement processing, and the start of a series of image capturing operations of driving a mirror and a shutter, processing the signal read out from the image sensor 101, and writing the read out signal in the recording medium 109. The operation unit 107 further includes a mode switch which performs setting/switching of the operation modes of the image capturing apparatus. Setting/switching of a moving image mode of performing moving image capturing and a still image mode of performing normal still image capturing is performed by setting the mode switch. The timing generation circuit 110 generates and outputs a timing for each control signal which drives the image sensor 101 upon receiving a signal from the control circuit 106.

FIG. 2 is a view showing a unit pixel including a photodiode serving as a light receiving element in the image sensor 101 in FIG. 1.

Referring to FIG. 2, in this example, the anode of a photodiode 201 which generates light signal charges corresponding to incident light upon photoelectric conversion is grounded. A floating diffusion (FD) 206 is connected to the cathode side of the photodiode 201 via a transfer transistor 202. The FD 206 is also connected to the gate of an amplification transistor 204. The source of a reset transistor 203 configured to reset a voltage signal corresponding to the signal charges generated in the photodiode 201 is connected to the gate of the amplification transistor 204 which amplifies this signal. A power supply voltage VDD is supplied to the drain of the reset transistor 203.

The power supply voltage VDD is also supplied to the amplification transistor 204. The source of the amplification transistor 204 is connected to the drain of a selection transistor 205. The above-described transfer transistor 202 is driven by a signal Ptx input to its gate terminal to transfer the signal charges of the photodiode 201 to the FD 206.

The gate terminal of the reset transistor 203 is driven by a signal Pres to reset the FD 206 and the photodiode 201. An output signal after this reset is read out as a noise signal. The gate terminal of the selection transistor 205 is driven by a signal Psel to output an electrical signal amplified by each connected amplification transistor to a terminal Vout.

The above-described terminal Vout is connected to a first column signal line Vla and a second column signal line Vlb of FIG. 3 to be described later. Furthermore, the amplification transistor 204 is connected to a column signal line load via the selection transistor 205 and functions as a source follower amplifier.

Figures 4, 5:
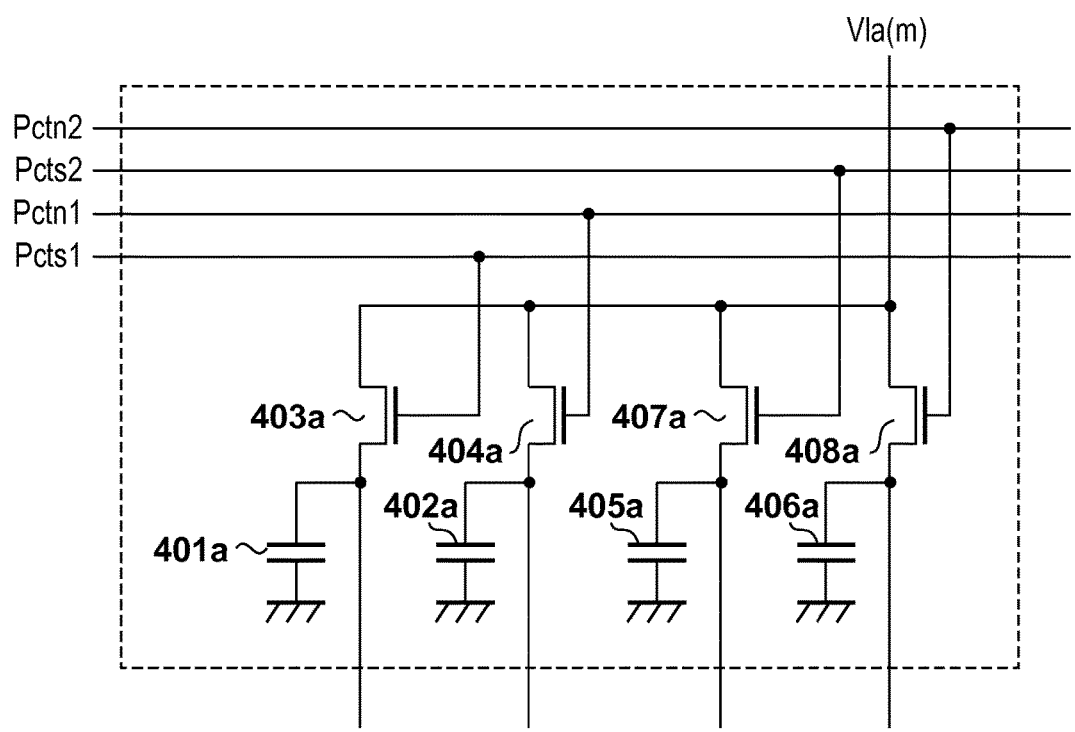
FIG. 4 is a view showing the arrangement of a readout circuit of the solid-state image sensor according to the first embodiment.
FIG. 5 is a view showing an example of a Bayer arrangement of the solid-state image sensor according to the first embodiment.

FIG. 3 is a block diagram showing an example of the arrangement of the image sensor 101. In a pixel array 300, a plurality of unit pixels shown in FIG. 2 are arrayed in the row direction and the column direction. For the sake of simplicity, only 6 (columns)×8 (rows) pixels are shown here. The pixel array 300 is formed by repeatedly arranging the pixels in the row direction and the column direction by a predetermined number of times. Note that color filters of R, G, and B shown in FIG. 5 are arranged in a Bayer pattern in the respective unit pixels in the pixel array 300. A pair of two column signal lines are arranged for one column out of pixel columns where the unit pixels are arrayed.

Then, the unit pixels on each column are connected to the alternately different column signal lines for the respective rows. That is, the unit pixels of the same color on the same column are connected to the same column signal line in accordance with a Bayer color filter arrangement. Note that in FIG. 3, (n) and (n+1) following control signal names indicate an nth row and an (n+1)th row, respectively. Further, (m) and (m+1) following the first and second column signal lines Vla and Vlb indicate an mth column and an (m+1)th column, respectively.

A vertical scanning circuit 301 outputs the signals Pres, Ptx, and Psel to the pixel array 300 via respective row selection lines upon receiving a signal from the timing generation circuit 110. Each of the aforementioned control signals is connected to each unit pixel arrayed on the same row in common. The pixels on the same row are driven simultaneously.

The terminal Vout of each unit pixel on the nth row is connected to a constant current source 304a serving as a load via each column signal line Vla and its output signal is read out by a first readout circuit 315a. The terminal Vout of each unit pixel on the (n+1)th row is connected to a constant current source 304b serving as a load via each column signal line Vlb and its output signal is read out by a second readout circuit 315b. Note that the first readout circuit 315a and the second readout circuit 315b have the same arrangement and only differ in their connection destinations. The first readout circuit 315a is connected to the first column signal line Vla and the second readout circuit 315b is connected to the second column signal line Vlb, respectively. Likewise, from the subsequent rows, the terminals Vout of the respective unit pixels are connected to the alternately different column signal lines for the respective rows and output signals are read out by the first readout circuit 315a or the second readout circuit 315b.

Note that with the above-described arrangement, the relationship of a color arrangement of the color filters in the Bayer pattern is established, and the output terminals of the pixel portions are connected to the different column signal lines for the respective rows. Therefore, the pixel outputs indicating the same color on a single column are output onto the same column signal line.

The first and second readout circuits 315a and 315b hold pixel signals and noise signals read out from the pixel array 300 in their transfer capacitors. A detailed description thereof will be given later. Furthermore, the first and second readout circuits 315a and 315b serve as the first holding block and the second holding block, respectively.

Transfer transistors 305a and 307a, and 306a and 308a output the signals stored in the transfer capacitors in the first readout circuit 315a to a row readout line Psa or Pna upon receiving control signals generated by a scanning clock signal PH and a scanning row switching signal LSEL from a first horizontal scanning circuit 303a. At this time, the signals are output to the row readout line Psa by the transfer transistors 305a and 307a, and to the row readout line Pna by the transfer transistors 306a and 308a.

Likewise, transfer transistors 305b and 307b, and 306b and 308b sequentially output the signals stored in the transfer capacitors in the second readout circuit 315b to a row readout line Psb or Pnb upon receiving control signals generated by the scanning clock signal PH and the scanning row switching signal LSEL from a second horizontal scanning circuit 303b. At this time, the signals are output to the row readout line Psb by the transfer transistors 305b and 307b, and to the row readout line Pnb by the transfer transistors 306b and 308b.

Note that the transfer transistors 305a, 306a, 305b, and 306b are operable when the signal LSEL is in a Hi state, and the transfer transistors 307a, 308a, 307b, and 308b are operable when the signal LSEL is in a Lo state. This makes it possible to use the different transfer capacitors for the respective rows, and simultaneously perform a signal readout operation from each pixel portion and sequential output operations by horizontal transferring in one horizontal scanning period.

The first horizontal scanning circuit 303a causes the scanning clock signal PH and a signal PHST to sequentially perform signal output to the row readout lines Psa and Pna. The second horizontal scanning circuit 303b causes the scanning clock signal PH and the signal PHST to sequentially perform signal output to the row readout lines Psb and Pnb.

A differential amplifier 302a outputs the difference between the signal of the row readout line Psa and the signal of the row readout line Pna outside the image sensor. Likewise, a differential amplifier 302b outputs the difference between the signal of the row readout line Psb and the signal of the row readout line Pnb outside the image sensor. Furthermore, the differential amplifiers 302a and 302b correspond to readout circuits for the final stage.

FIG. 4 is a view showing a circuit example in the first and second readout circuits 315a and 315b shown in FIG. 3. FIG. 4 shows, as an example, a readout circuit for one line to which a column signal line Vla(m) on the mth column for one pixel column in the first readout circuit 315a is connected. Other columns are formed in the same manner in accordance with the number of pixel columns.

Also, the second readout circuit 315b is formed in the same manner as the first readout circuit 315a only except that transfer transistors connected to a column signal line Vlb(m) and the row readout lines Psb and Pnb are different.

Outputs from the terminals Vout of the respective pixel portions are held in respective transfer capacitors 401a, 402a, 405a, and 406a via transfer transistors 403a, 404a, 407a, and 408a which are driven by and connected to a signal Pcts1, a signal Pctn1, a signal Pcts2, and a signal Pctn2.

Note that a noise signal generated in a pixel circuit portion is held in the transfer capacitor 402a or 406a and a pixel signal corresponding to charges transferred from the photodiode 201 to the FD 206 afterward is held in the transfer capacitor 401a or 405a by driving using a timing chart to be described later. The respective signals held in the respective transfer capacitors described above are transferred to the differential amplifiers 302a and 302b sequentially, thereby outputting the pixel signal for one row.

Figure 6:
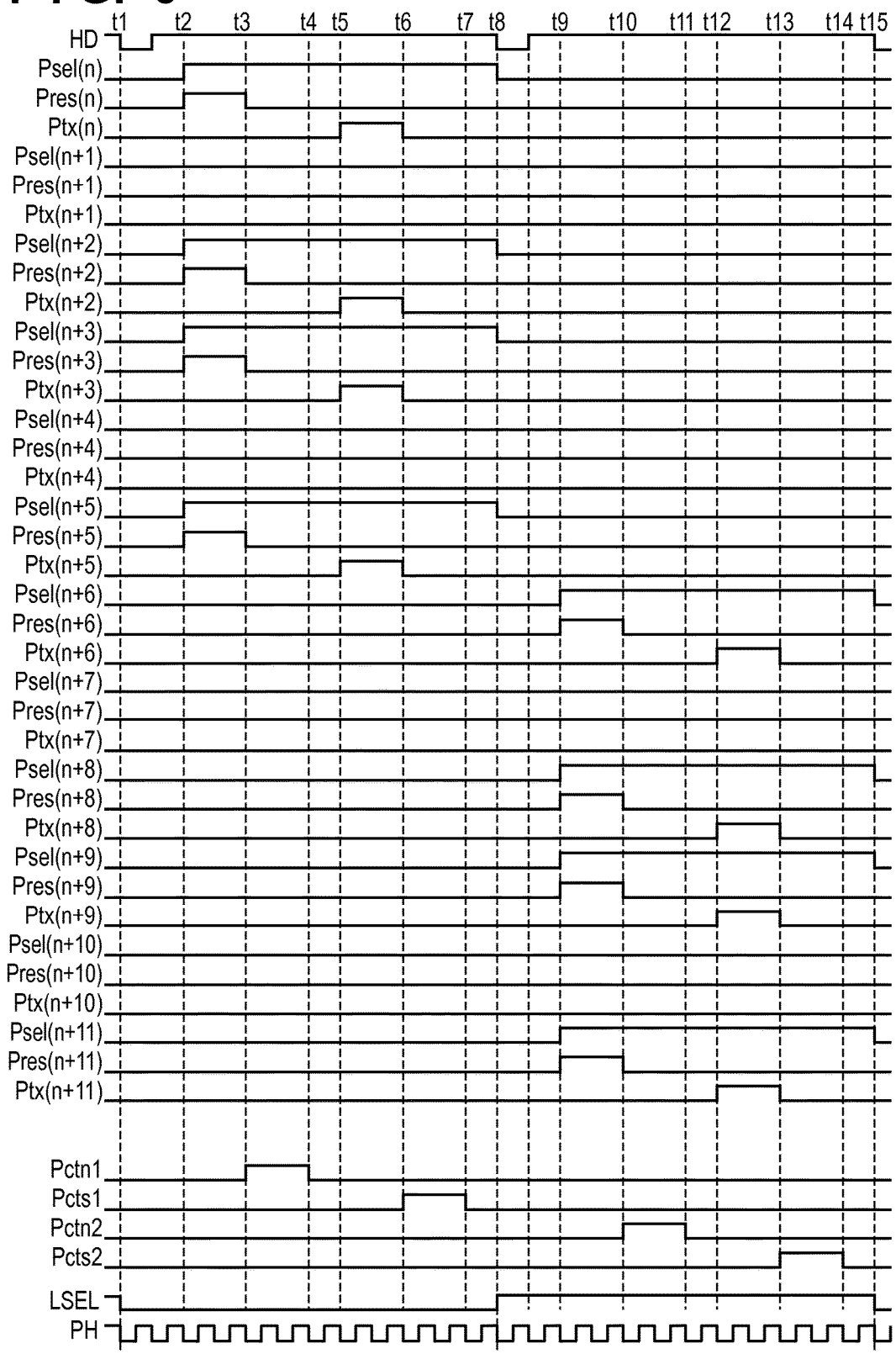
FIG. 6 is a chart showing a driving timing when reading out mixed pixel outputs according to the first embodiment.

FIG. 6 is a driving timing chart of the solid-state image sensor described with reference to FIGS. 1 to 5 and shows an operation timing at a pixel output additive readout operation such as a moving image capturing mode. In this embodiment, the signals of two pixels having the same color vertically are output to the column signal line simultaneously and mixed on the column signal line.

When signal voltages input to the amplification transistor 204 which functions as a source follower are equal or close to each other, the current of the load constant current source 304a or 304b is distributed equally to the respective amplification transistors to be connected. The present invention accordingly takes advantage of averaging the signal voltages. Furthermore, respective two pairs of transfer capacitors (for two transfer capacitors) which are provided for one column signal line and hold the pixel signals and the noise signals are used selectively. By doing so, the image sensor is driven to perform the signal readout operation from each pixel and a horizontal transferring operation between the different rows simultaneously in the one horizontal scanning period. Additionally, it is possible to perform, with a simple arrangement and at a high speed, a readout operation at the time of pixel mixture (averaging) together with simultaneous readout operations for two rows with respect to the one pixel column by the two column signal lines.

Note that in FIG. 6, a driving transistor is turned on when a signal level is in the "Hi" state and the driving transistor is turned off when the signal level is in the "Lo" state. For the sake of simplicity, FIG. 6 omits a timing of starting an all-pixel reset operation and an all-pixel accumulation operation, and only shows a timing at a pixel signal readout operation.

In one horizontal scanning period from times t1 to t8, operations of transferring the pixel signals and the noise signals to the transfer capacitors on the nth row, an (n+2)th row, an (n+3)th row, and an (n+5)th row are performed. In parallel with that simultaneously, an operation of sequentially outputting the pixel signals and the noise signals on an (n−6)th row, an (n−4)th row, an (n−1)th row, and an (n−3)th row (not shown) from the transfer capacitors to an output amplifiers is also performed.

Operations on the (n−6)th row, the (n−4)th row, the (n−1)th row, and the (n−3)th row in the above-described time period will now be described. At time t1, the signal LSEL changes to Lo and the signals stored in the transfer capacitor 405a are sequentially read out to the row readout line Psa via the transfer transistor 307a in synchronism with the horizontal scanning clock signal PH input to the first and second horizontal scanning circuits 303a and 303b. Simultaneously, the signals stored in the transfer capacitor 406a are sequentially read out to the row readout line Pna via the transfer transistor 308a.

Simultaneously, the signals stored in the transfer capacitor 405b are sequentially read out to the row readout line Psb via the transfer transistor 307b. Simultaneously, the signals stored in the transfer capacitor 406b are sequentially read out to the row readout line Pnb via the transfer transistor 308b. The output amplifier 302a externally outputs a difference signal between the row readout line Psa and the row readout line Pna. The signal output at this time becomes a signal obtained by mixing the outputs on the (n−6)th row and the (n−4)th row. Likewise, the output amplifier 302b externally outputs a difference signal between the row readout line Psb and the row readout line Pnb. The signal output at this time becomes a signal obtained by mixing the outputs on the (n−1)th row and the (n−3)th row.

The operations of transferring the signal charges to the transfer capacitors on the nth row, the (n+2)th row, the (n+3)th row, and the (n+5)th row which are performed simultaneously with the output to the outside described above will now be described.

At time t2, a signal Psel(n) and a signal Psel(n+2) change from Lo to Hi, the selection transistors 205 on the nth row and the (n+2)th row are turned on, and respective source follower outputs on the nth row and the (n+2)th row are connected to the first column signal line Vla. Simultaneously, a signal Psel(n+3) and a signal Psel(n+5) change from Lo to Hi, the selection transistors 205 on the (n+3)th row and the (n+5)th row are turned on, and respective source follower outputs on the (n+3)th row and the (n+5)th row are connected to the second column signal line Vlb.

Also, at time t2, a signal Pres(n) and a signal Pres(n+2), and a signal Pres(n+3) and a signal Pres(n+5) change from Lo to Hi. Then, the reset transistors 203 on the nth row and the (n+1)th row, and the (n+3)th row and the (n+5)th row are turned on, and unnecessary charges accumulated in the FDs 206 on those rows are reset.

At time t3, at the end of the reset, the signal Pctn1 changes from Lo to Hi, the transfer transistor 404a is turned on, and a noise component generated in the pixel circuit is stored in the transfer capacitor 402a. At time t4, the signal Pctn1 changes from Hi to Lo and storage of the noise component in the transfer capacitor 402a is ended.

At time t5, a signal Ptx(n) and a signal Ptx(n+2) change from Lo to Hi, and the transfer transistors 202 on the nth row and the (n+2)th row are turned on. Then, the signal charges accumulated in the PD 201 on the nth row or the signal charges accumulated in the PD 201 on the (n+2)th row are transferred to the FD 206, amplified by the amplification transistor 204, and then converted into a voltage. Then, a voltage signal on the nth row and a voltage signal on the (n+2)th row are output onto the first column signal line Vla simultaneously and mixed.

Simultaneously, a signal Ptx(n+3) and a signal Ptx(n+5) change from Lo to Hi, and the transfer transistors 202 on the (n+3)th row and the (n+5)th row are turned on. Then, the signal charges accumulated in the PD 201 on the (n+3)th row or the signal charges accumulated in the PD 201 on the (n+5)th row are transferred to the FD 206, amplified by the amplification transistor 204, and then converted into a voltage. Then, a voltage signal on the (n+3)th row and a voltage signal on the (n+5)th row are output onto the second column signal line Vlb simultaneously and mixed.

At time t6, a signal Ptcs1 changes from Lo to Hi, the transfer transistor 403a is turned on, and the pixel signals mixed in the first and second column signal lines Vla and Vlb are stored in the transfer capacitors 401a in the first and second readout circuits 315a and 315b. At time t7, the signal Ptcs1 changes from Hi to Lo, the transfer transistor 403a is turned off, and storage of the pixel signals in the transfer capacitor 401a is ended. After that, in one horizontal scanning period from times t8 to t15, a signal obtained by mixing signals on the nth row and the (n+2)th row is output from the output amplifier 302a, and a signal obtained by mixing signals on the (n+3)th row and the (n+5)th row simultaneously is output from the output amplifier 302b.

At time t8, the signal Psel(n) and the signal Psel(n+2), and the signal Psel(n+3) and the signal Psel(n+5) change from Hi to Lo, the selection transistor 205 is turned off, and connections of the nth row and the (n+2)th row, and the (n+3)th row and the (n+5)th row to the first and second column signal lines Vla and Vlb are released.

From time t9, in the same manner as described above, the (n+6)th row and the (n+8)th row to be read as the next row are connected to the first column signal line Vla, the (n+9)th row and the (n+11)th row are connected to the second column signal line Vlb, and then the mixed pixel signals are read out. At this time, in addition to the signal Psel which selects the row itself, the transfer capacitors and the transfer transistors which hold the noise signals and the pixel signals in the first and second readout circuits 315a and 315b, the transfer transistors which transfer the signals to the row readout lines, and their control signals are different from those in the above description.

Note that it is possible to simultaneously perform an operation of horizontally transferring the pixel output on the previous row and an operation of reading out the pixel signal on the current row by using the aforementioned transfer capacitor on the previous row in combination and switching, and to achieve a high-speed readout operation as well as the multiple column signal lines for the one pixel column.

At time t9, a signal Psel(n+6) and a signal Psel(n+8) change from Lo to Hi, the selection transistors 205 on the (n+6)th row and the (n+8)th row are turned on, and source follower outputs on the (n+6)th row and the (n+8)th row are connected to the first column signal line Vla. Simultaneously, a signal Psel(n+9) and a signal Psel(n+11) change from Lo to Hi, the selection transistors 205 on the (n+9)th row and the (n+11)th row are turned on, and source follower outputs on the (n+9)th row and the (n+11)th row are connected to the second column signal line Vlb.

Also, at time t9, a signal Pres(n+6) and a signal Pres(n+8), and a signal Pres(n+9) and a signal Pres(n+11) change from Lo to Hi. Then, the reset transistors 203 on the (n+6)th row and the (n+8)th row, and the (n+9)th row and the (n+11)th row are turned on, and unnecessary charges accumulated in the FDs 206 on those rows are reset.

At time t10, at the end of the reset, the signal Pctn2 changes from Lo to Hi, the transfer transistor 408a is turned on, and the noise component generated in the pixel circuit is stored in the transfer capacitor 406a. At time t11, the signal Pctn2 changes from Hi to Lo and storage of the noise component in the transfer capacitor 406a is ended.

At time t12, a signal Ptx(n+6) and a signal Ptx(n+8) change from Lo to Hi, and the transfer transistors 202 on the (n+6)th row and the (n+8)th row are turned on. Then, the signal charges accumulated in the PD 201 on the (n+6)th row or the signal charges accumulated in the PD 201 on the (n+8)th row are transferred to the FD 206, amplified by the amplification transistor 204, and then converted into a voltage. Then, a voltage signal on the (n+6)th row and a voltage signal on the (n+8)th row are output onto the first column signal line Vla simultaneously and mixed.

Simultaneously, a signal Ptx(n+9) and a signal Ptx(n+11) change from Lo to Hi, and the transfer transistors 202 on the (n+9)th row and the (n+11)th row are turned on. Then, the signal charges accumulated in the PD 201 on the (n+9)th row or the signal charges accumulated in the PD 201 on the (n+11)th row are transferred to the FD 206, amplified by the amplification transistor 204, and then converted into a voltage. Then, a voltage signal on the (n+9)th row and a voltage signal on the (n+11)th row are output onto the second column signal line Vlb simultaneously and mixed.

At time t13, a signal Ptcs2 changes from Lo to Hi, the transfer transistor 407a is turned on, and the pixel signals mixed in the first and second column signal lines Vla and Vlb are stored in the transfer capacitors 405a in the first and second readout circuits 315a and 315b. At time t14, the signal Ptcs2 changes from Hi to Lo, the transfer transistor 407a is turned off, and storage of the pixel signals in the transfer capacitor 405a is ended.

In one horizontal scanning period afterward, a signal obtained by mixing signals on the (n+6)th row and the (n+8)th row is output from the output amplifier 302a, and a signal obtained by mixing signals on the (n+9)th row and the (n+11)th row simultaneously is output from the output amplifier 302b. Note that, every one horizontal scanning, the scanning row switching signal LSEL is switched between the Lo state and the Hi state, and alternately changes to the Lo state and the Hi state.

The transfer transistor which transfers the signal from the transfer capacitor is enabled depending on the state of the scanning row switching signal LSEL. However, by switching the states of the scanning row switching signal LSEL every one horizontal scanning, it is possible to simultaneously perform the readout operation on the next row as well in the other transfer capacitor and the transfer transistor by enabling the operation of the transfer transistor together with the transfer capacitor which has held the pixel signal during the previous one horizontal scanning and sequentially outputting the signals held in the transfer capacitors in advance.

By sequentially repeating such operations for the respective rows included in the solid-state image sensor, the high-speed readout operation becomes possible even at the time of pixel output mixture.

Figure 7:
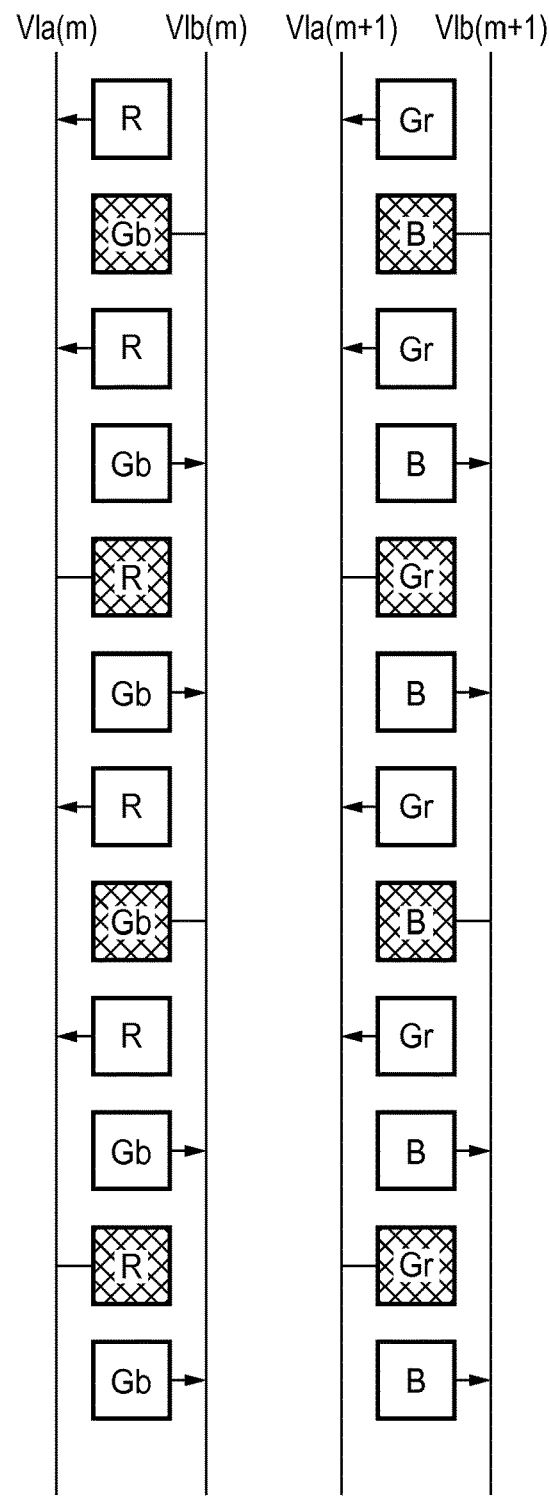
FIG. 7 is a schematic view when the Bayer arrangement is applied to the solid-state image sensor according to the first embodiment.

FIG. 7 is a schematic view when the readout operation according to this embodiment is applied to color image sensors in the Bayer arrangement and shows a mixture readout operation.

In this embodiment, the same pixel column includes two column signal lines. Therefore, signals are read out to a different column signal line for each color component in the Bayer arrangement. The signals of R on the same column are read out to the first column signal line Vla(m), the signals of Gb are read out to the second column signal line Vlb(m), the signals of Gr are read out to a first column signal line Vla(m+1), and the signals of B are read out to a second column signal line Vlb(m+1).

Referring to FIG. 7, no readout operations are performed in hatched pixels. When the pixel output mixture operation as described above is performed, mixture for the two pixels of the signals having the same color is performed on the column signal line. An image after the mixture is in the Bayer arrangement and can undergo the same signal processing as before. Note that the barycenter of each color becomes the center of a region for the mixed two pixels having the same color by the mixture and is positioned on the pixel where a different color has been assigned before the mixture. However, since the barycenters of the signals after the mixture are arranged at equal intervals, occurrence of a false signal such as a moire can be suppressed.

(Second Embodiment)

Figure 8:
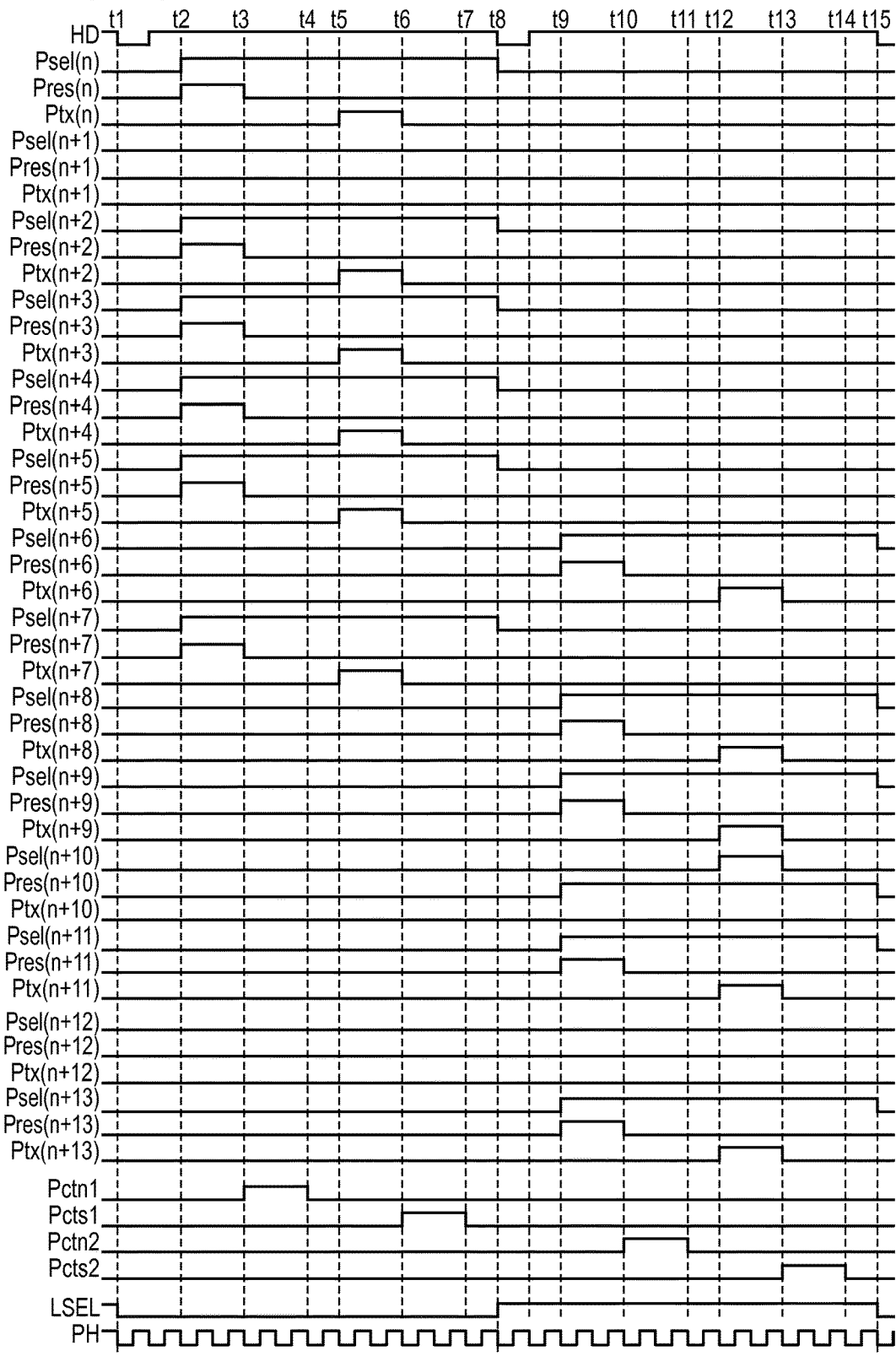
FIG. 8 is a chart showing a driving timing when reading out mixed pixel outputs according to the second embodiment.

FIG. 8 is a driving timing chart of a solid-state image sensor according to the second embodiment of the present invention and shows an operation timing at a pixel output mixture readout operation. Note that the arrangement of an image capturing apparatus is the same as in the first embodiment.

In this embodiment, mixture of three pixel outputs having the same color vertically is performed, or more specifically, the mixture is performed on a column signal line by performing simultaneous output operations to the same column signal line for three rows having the same color.

In one horizontal scanning period from times t1 to t8, operations of transferring pixel signals and noise signals to transfer capacitors on an nth row, an (n+2)th row, and an (n+4)th row, and an (n+3)th row, an (n+5)th row, and an (n+7)th row are performed. Operations of sequentially outputting the pixel signals and the noise signals from the transfer capacitors to output amplifiers on an (n−6)th row, an (n−4)th row, an (n−2)th row, an (n−3)th row, an (n−1)th row, and an (n+1)th row (not shown) are also performed. Note that this embodiment is different from the aforementioned first embodiment in that the number of pixel outputs to be mixed changes from two to three and the number of rows having the same color to be selected simultaneously also changes to three accordingly.

Operations on the (n−6)th row, the (n−4)th row, the (n−2)th row, the (n−3)th row, the (n−1)th row, and the (n+1)th row in the above-described time period will now be described.

At time t1, a signal LSEL changes to Lo and signals stored in a transfer capacitor 405a are sequentially read out to a row readout line Psa via a transfer transistor 307a in synchronism with a horizontal scanning clock signal PH input to a first and second horizontal scanning circuits 303a and 303b. Simultaneously, signals stored in a transfer capacitor 406a are sequentially read out to a row readout line Pna via a transfer transistor 308a.

Simultaneously, signals stored in a transfer capacitor 405b are sequentially read out to a row readout line Psb via a transfer transistor 307b. Simultaneously, signals stored in a transfer capacitor 406b are sequentially read out to a row readout line Pnb via a transfer transistor 308b.

An output amplifier 302a externally outputs a difference signal between the row readout line Psa and the row readout line Pna. The signal output at this time becomes a signal obtained by mixing the outputs on the (n−6)th row, the (n−4)th row, and the (n−2)th row.

Likewise, an output amplifier 302b externally outputs a difference signal between the row readout line Psb and the row readout line Pnb. The signal output at this time becomes a signal obtained by mixing the outputs on the (n−3)th row, the (n−1)th row, and the (n+1)th row.

The operations of transferring the signals to the transfer capacitors on the nth row, the (n+2)th row, and the (n+4)th row, and the (n+3)th row, the (n+5)th row, and the (n+7)th row which are performed simultaneously with the output to the outside described above will now be described.

At time t2, a signal Psel(n), a signal Psel(n+2), and a signal Psel(n+4) change from Lo to Hi, and selection transistors 205 on the nth row, the (n+2)th row, and the (n+4)th row are turned on. Then, respective source follower outputs on the nth row, the (n+2)th row, and the (n+4)th row are connected to a first column signal line Vla.

Simultaneously, a signal Psel(n+3), a signal Psel(n+5), and a signal Psel(n+7) change from Lo to Hi, and the selection transistors 205 on the (n+3)th row, the (n+5)th row, and the (n+7)th row are turned on. Then, respective source follower outputs on the (n+3)th, the (n+5)th row, and the (n+7)th row are connected to a second column signal line Vlb.

Also, at time t2, a signal Pres(n), a signal Pres(n+2), and a signal Pres(n+4), and a signal Pres(n+3), a signal Pres(n+5), and a signal Pres(n+7) change from Lo to Hi, reset transistors 203 on the nth row, the (n+2)th row, and the (n+4)th row, and the (n+3)th row, the (n+5)th row, and the (n+7)th row are turned on, and unnecessary charges accumulated in the FDs 206 on those rows are reset.

At time t3, at the end of the reset, a signal Pctn1 changes from Lo to Hi, a transfer transistor 404a is turned on, and a noise component generated in a pixel circuit is stored in a transfer capacitor 402a. At time t4, the signal Pctn1 changes from Hi to Lo and storage of the noise component in the transfer capacitor 402a is ended.

At time t5, a signal Ptx(n), a signal Ptx(n+2), and a signal Ptx(n+4) change from Lo to Hi, and transfer transistors 202 on the nth row, the (n+2)th row, and the (n+4)th row are turned on. Then, signal charges accumulated in a PD 201 on the nth row, signal charges accumulated in the PD 201 on the (n+2)th row, or signal charges accumulated in the PD 201 on the (n+4)th row are transferred to the FD 206, amplified by an amplification transistor 204, and then converted into a voltage. Then, a voltage signal on the nth row, a voltage signal on the (n+2)th row, and a voltage signal on the (n+4)th row are output onto the first column signal line Vla simultaneously and mixed.

Simultaneously, a signal Ptx(n+3), a signal Ptx(n+5), and a signal Ptx(n+7) change from Lo to Hi, and the transfer transistors 202 on the (n+3)th row, the (n+5)th row, and the (n+7)th row are turned on. Then, signal charges accumulated in the PD 201 on the (n+3)th row, signal charges accumulated in the PD 201 on the (n+5)th row, or signal charges accumulated in the PD 201 on the (n+7)th row are transferred to the FD 206, amplified by the amplification transistor 204, and then converted into a voltage. Then, a voltage signal on the (n+3)th row, a voltage signal on the (n+5)th row, and a voltage signal on the (n+7)th row are output onto the second column signal line Vlb simultaneously and mixed.

At time t6, a signal Ptcs1 changes from Lo to Hi, a transfer transistor 403a is turned on, and the pixel signals mixed in the first and second column signal lines Vla and Vlb are stored in transfer capacitors 401a in a first and second readout circuit 315a and 315b. At time t7, the signal Ptcs1 changes from Hi to Lo, the transfer transistor 403a is turned off, and storage of the pixel signals in the transfer capacitor 401a is ended.

After that, in one horizontal scanning period from times t8 to t15, a signal obtained by mixing signals on the nth row, the (n+2)th row, and the (n+4)th row is output from the output amplifier 302a. A signal obtained by mixing signals on the (n+3)th row, the (n+5)th row, and the (n+7)th row simultaneously is output from the output amplifier 302b.

At time t8, the signal Psel(n), the signal Psel(n+2), and the signal Psel(n+4), and the signal Psel(n+3), the signal Psel(n+5), and the signal Psel(n+7) change from Hi to Lo, the selection transistors 205 are turned off. Connections of the nth row, the (n+2)th row, and the (n+4)th row, and the (n+3)th row, the (n+5)th row, and the (n+7)th row to the first and second column signal lines Vla and Vlb are released.

From time t9, in the same manner as described above, the (n+6)th row, the (n+8)th row, and the (n+10)th row to be read as the next rows are connected to the first column signal line Vla, the (n+9)th row, the (n+11)th row, and the (n+13)th row are connected to the second column signal line Vlb, and then the mixed pixel signals are read out.

At time t9, a signal Psel(n+6), a signal Psel(n+8), and a signal Psel(n+10) change from Lo to Hi, the selection transistors 205 on the (n+6)th row, the (n+8)th row, and the (n+10)th row are turned on. Then, source follower outputs on the (n+6)th row, the (n+8)th row, and the (n+10)th row are connected to the first column signal line Vla.

Simultaneously, a signal Psel(n+9), a signal Psel(n+11), and a signal Psel(n+13) change from Lo to Hi, the selection transistors 205 on the (n+9)th row, the (n+11)th row, and the (n+13)th row are turned on. Then, source follower outputs on the (n+9)th row, the (n+11)th row, and the (n+13)th row are connected to the second column signal line Vlb.

Also, at time t9, a signal Pres(n+6), a signal Pres(n+8), and a signal Pres(n+10), and a signal Pres(n+9), a signal Pres(n+11), and a signal Pres(n+13) change from Lo to Hi. Then, the reset transistors 203 on the (n+6)th row, the (n+8)th row, and the (n+10)th row, and the (n+9)th row, the (n+11)th row, and the (n+13)th row are turned on, and unnecessary charges accumulated in the FDs 206 on those rows are reset.

At time t10, at the end of the reset, a signal Pctn2 changes from Lo to Hi, a transfer transistor 408a is turned on, and the noise component generated in the pixel circuit is stored in a transfer capacitor 406a. At time t11, the signal Pctn2 changes from Hi to Lo and storage of the noise component in the transfer capacitor 406a is ended.

At time t12, a signal Ptx(n+6), a signal Ptx(n+8), and a signal Ptx(n+10) change from Lo to Hi, and the transfer transistors 202 on the (n+6)th row, the (n+8)th row, and the (n+10)th row are turned on. Then, the signal charges accumulated in the PD 201 on the (n+6)th row, the signal charges accumulated in the PD 201 on the (n+8)th row, or the signal charges accumulated in the PD 201 on the (n+10)th row are transferred to the FD 206, amplified by the amplification transistor 204, and then converted into a voltage. Then, a voltage signal on the (n+6)th row, a voltage signal on the (n+8)th row, and a voltage signal on the (n+10)th row are output onto the first column signal line Vla simultaneously and mixed.

Simultaneously, a signal Ptx(n+9), a signal Ptx(n+11), and a signal Ptx(n+13) change from Lo to Hi, and the transfer transistors 202 on the (n+9)th row, the (n+11)th row, and the (n+13)th row are turned on. Then, the signal charges accumulated in the PD 201 on the (n+9)th row, the signal charges accumulated in the PD 201 on the (n+11)th row, or the signal charges accumulated in the PD 201 on the (n+13)th row are transferred to the FD 206, amplified by the amplification transistor 204, and then converted into a voltage. Then, a voltage signal on the (n+9)th row, a voltage signal on the (n+11)th row, and a voltage signal on the (n+13)th row are output onto the second column signal line Vlb simultaneously and mixed.

At time t13, a signal Ptcs2 changes from Lo to Hi, a transfer transistor 407a is turned on, and the pixel signals mixed in the first and second column signal lines Vla and Vlb are stored in the transfer capacitors 405a in the first and second readout circuits 315a and 315b. At time t14, the signal Ptcs2 changes from Hi to Lo, the transfer transistor 407a is turned off, and storage of the pixel signals in the transfer capacitor 405a is ended.

In one horizontal scanning period afterward, a signal obtained by mixing signals on the (n+6)th row, the (n+8)th row, and the (n+10)th row is output from the output amplifier 302a, and a signal obtained by mixing signals on the (n+9)th row, the (n+11)th row, and the (n+13)th row simultaneously is output from the output amplifier 302b.

By sequentially repeating such operations for the respective rows included in the solid-state image sensor, the high-speed readout operation becomes possible even at the time of pixel mixture.

Figure 9:
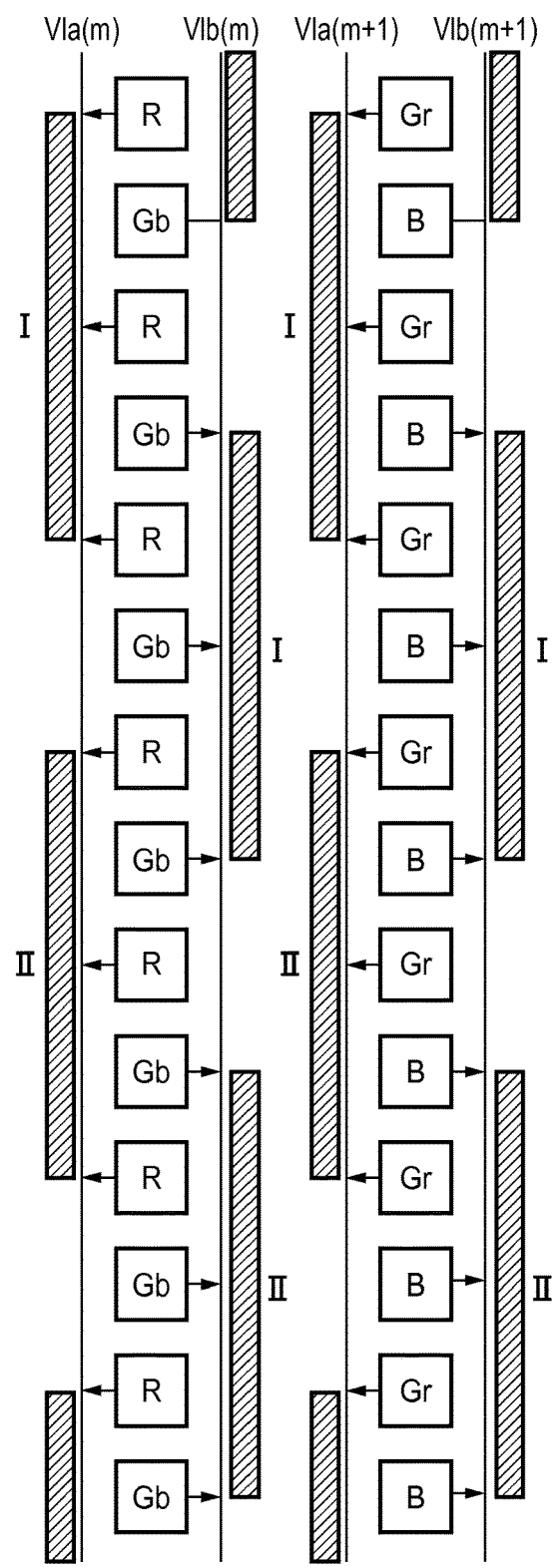
FIG. 9 is a schematic view when a Bayer arrangement is applied to a solid-state image sensor according to the second embodiment.

FIG. 9 is a schematic view when the readout operation according to this embodiment is applied to color image sensors in the Bayer arrangement and shows a mixture readout operation.

In this embodiment, the same pixel column includes two column signal lines. Therefore, signals are read out to a different column signal line for each color component in the Bayer arrangement. The signals of R on the same column are read out to a first column signal line Vla(m), the signals of Gb are read out to a second column signal line Vlb(m), the signals of Gr are read out to a first column signal line Vla(m+1), and the signals of B are read out to a second column signal line Vlb(m+1).

Referring to FIG. 9, when the pixel output mixture operation as described above is performed, mixture of three pixel outputs of the signals having the same color is performed on the column signal line. Note that thick line portions and numerals I and II are indicated on each column signal line. The thick line portions indicate pixel portions simultaneously read out and mixed. The numerals I and II indicate the pixel portions simultaneously read out by the same numeral in one horizontal scanning period. Note that an image after the mixture is in the Bayer arrangement and can undergo the same signal processing as before. Since the barycenters of the signals are arranged at equal intervals, occurrence of a false signal such as a moire can be suppressed.

Note that pixel mixture is performed between the two pixels and the three pixels having the same color in the first and second embodiments described above. However, the number of pixels is not limited to these. Pixel mixture between the plural numbers of pixels is possible by performing simultaneous output operations to the column signal line in accordance with the number of pixels to be mixed such that the signals after the mixture maintain the Bayer arrangement.

Figure 10:
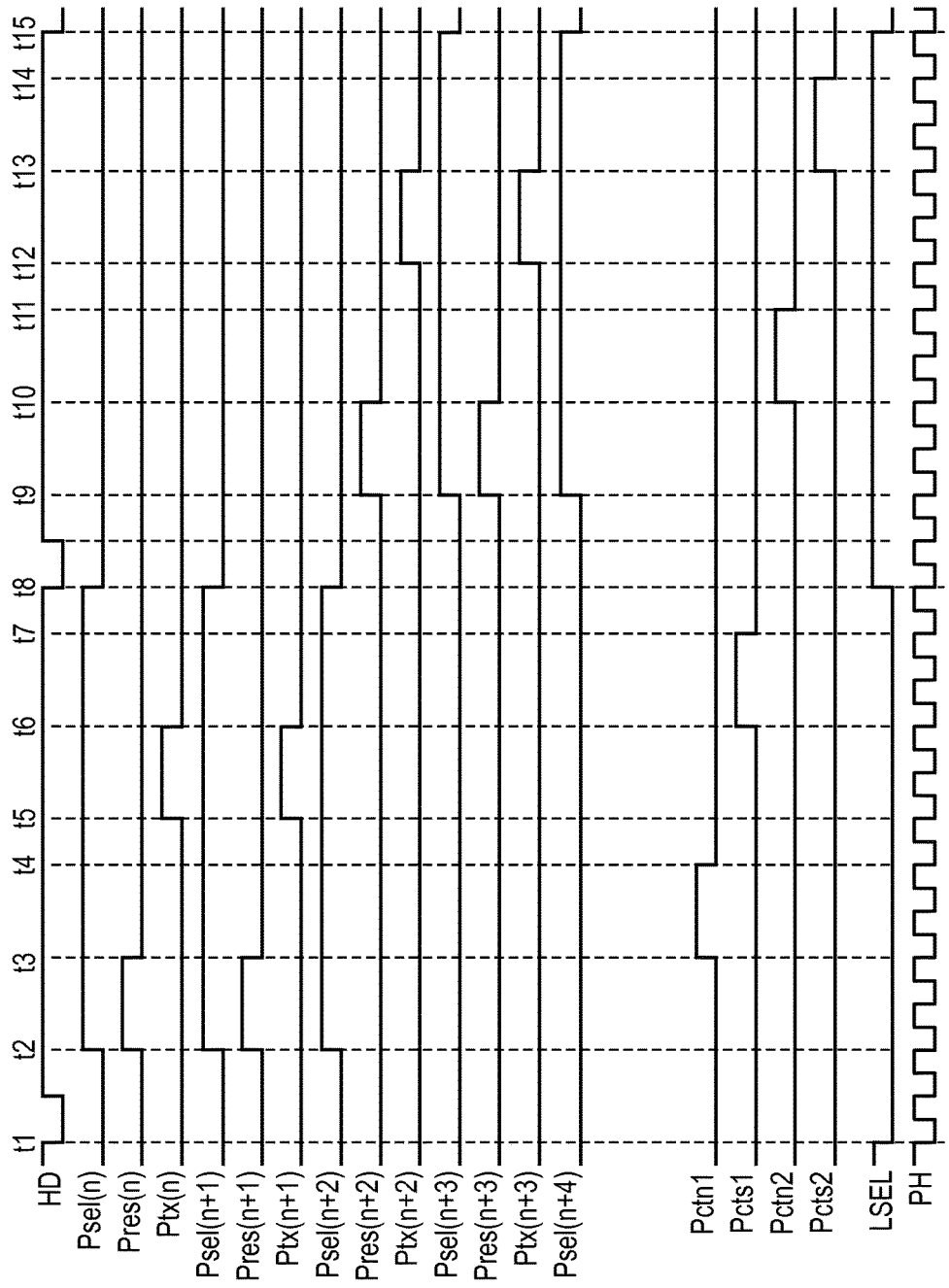
FIG. 10 is a chart showing a driving timing when reading out all pixels according to the first and second embodiments.

FIG. 10 is a driving timing chart of the solid-state image sensor that has been described with reference to FIGS. 1 to 5 and shows an operation timing when reading out all pixels in a still image mode in the first and second embodiments described above.

In this embodiment, two column signal lines are provided for one pixel column and the pixels are connected to the alternately different column signal lines for the respective rows. Therefore, it is possible to simultaneously read out the pixels on the two rows. When reading out all the pixels, they are read out at a high speed by reading them on the two rows simultaneously.

Note that it is assumed that the operation mode switch of an operation unit 7 sets the image capturing apparatus to the still image mode for performing normal still image capturing. In FIG. 10, a driving transistor is turned on when a signal level is in a "Hi" state and the driving transistor is turned off when the signal level is in a "Lo" state. For the sake of simplicity, FIG. 10 omits a timing of starting an all-pixel reset operation and an all-pixel accumulation operation, and only shows a timing at a pixel signal readout operation.

The all-pixel readout operation will be described with reference to FIG. 10. In one horizontal scanning period from times t1 to t8, operations of transferring the pixel signals and the noise signals to the transfer capacitors on an nth row and the (n+1)th row are performed. Furthermore, the pixel signals and the noise signals on the (n−2)th row and the (n−1)th row (not shown) are sequentially output from the transfer capacitors to output amplifiers, and then output outside the image sensor.

The operations on the (n−2)th row and the (n−1)th row in the above-described time period will now be described. At time t1, the signal LSEL changes to Lo and the signals stored in the transfer capacitor 405a are sequentially read out to the row readout line Psa via the transfer transistor 307a in synchronism with the horizontal scanning clock signal PH input to the first and second horizontal scanning circuits 303a and 303b. Simultaneously, the signals stored in the transfer capacitor 406a are sequentially read out to the row readout line Pna via the transfer transistor 308a.

Simultaneously, the signals stored in the transfer capacitor 405b are sequentially read out to the row readout line Psb via the transfer transistor 307b. Simultaneously, the signals stored in the transfer capacitor 406b are sequentially read out to the row readout line Pnb via the transfer transistor 308b.

The output amplifier 302a externally outputs the difference signal between the row readout line Psa and the row readout line Pna. The signal output at this time becomes an output signal on the (n−2)th row. Likewise, the output amplifier 302b externally outputs the difference signal between the row readout line Psb and the row readout line Pnb. The signal output at this time becomes an output signal on the (n−1)th row.

The operations of transferring the signals to the transfer capacitors on the nth row and the (n+1)th row which are performed simultaneously with the output to the outside described above will now be described. At time t2, the signal Psel(n) changes from Lo to Hi, the selection transistor 205 on the nth row is turned on, and each source follower output on the nth row is connected to the first column signal line Vla. Likewise, at time t2, a signal Psel(n+1) changes from Lo to Hi, the selection transistor 205 on the (n+1)th row is turned on, and each source follower output on the (n+1)th row is connected to the second column signal line Vlb.

Simultaneously, at time t2, the signal Pres(n) and the signal Pres(n+1) change from Lo to Hi, the reset transistors 203 on the nth row and the (n+1)th row are turned on, and unnecessary charges accumulated in the FDs 206 on those rows are reset.

At time t3, at the end of the reset, the signal Pctn1 changes from Lo to Hi, the transfer transistor 404a is turned on, and the noise component generated in the pixel circuit is stored in the transfer capacitor 402a. At time t4, the signal Pctn1 changes from Hi to Lo and storage of the noise component in the transfer capacitor 402a is ended.

At time t5, the signal Ptx(n) changes from Lo to Hi, the transfer transistor 202 on the nth row is turned on, the signal charges accumulated in the PD 201 on the nth row are transferred to the FD 206, amplified by the amplification transistor 204, and then converted into a voltage. Then, a voltage signal on the nth row is output onto the first column signal line Vla.

Simultaneously, the signal Ptx(n+1) changes from Lo to Hi, the transfer transistor 202 on the (n+1)th row is turned on, the signal charges accumulated in the PD 201 on the (n+1)th row are transferred to the FD 206, amplified by the amplification transistor 204, and then converted into a voltage. Then, a voltage signal on the (n+1)th row is output onto the second column signal line Vlb.

At time t6, the signal Ptcs1 changes from Lo to Hi, the transfer transistor 403a is turned on, and the pixel signals output to the first and second column signal lines Vla and Vlb are stored in the transfer capacitors 401a in the first and second readout circuits 315a and 315b. At time t7, the signal Ptcs1 changes from Hi to Lo, the transfer transistor 403a is turned off, and storage of the pixel signal in the transfer capacitor 401a is ended.

After that, in one horizontal scanning period from times t8 to t15, the signal on the nth row is output from the output amplifier 302a, and the signal on the (n+1)th row is output from the output amplifier 302b simultaneously.

At time t8, the signal Psel(n) and the signal Psel(n+1) change from Hi to Lo, the selection transistor 205 is turned off, and connections of the nth row and the (n+1)th row to the first and second column signal lines Vla and Vlb are released.

From time t9, in the same manner as described above, the (n+2)th row to be read as the next row is connected to the first column signal line Vla, the (n+3)th row is connected to the second column signal line Vlb, and then the pixel signals are read out. At this time, in addition to the signal Psel which selects the row itself, the transfer capacitors and the transfer transistors which hold the noise signals and the pixel signals in the first and second readout circuits 315a and 315b, the transfer transistors which transfer the signals to the row readout lines, and their control signals are different from those in the above description.

Note that it is possible to simultaneously perform an operation of horizontally transferring the pixel output on the previous row and an operation of reading out the pixel signal on the current row by using the aforementioned transfer capacitor on the previous row in combination and switching every one horizontal scanning period. This makes it possible to achieve a high-speed readout operation as well as the multiple column signal lines for the one pixel column.

At time t9, the signal Psel(n+2) changes from Lo to Hi, the selection transistor 205 on the (n+2)th row is turned on, and the source follower output is connected to the first column signal line Vla. Simultaneously, the signal Psel(n+3) changes from Lo to Hi, the selection transistor 205 on the (n+3)th row is turned on, and each source follower output on the (n+3)th row is connected to the second column signal line Vlb.

Also, at time t9, the signal Pres(n+2) and the signal Pres(n+3) change from Lo to Hi, the reset transistors 203 on the (n+2)th row and the (n+3)th are turned on, and unnecessary charges accumulated in the FDs 206 on those rows are reset.

At time t10, at the end of the reset, the signal Pctn2 changes from Lo to Hi, the transfer transistor 408a is turned on, and the noise component generated in the pixel circuit is stored in the transfer capacitor 406a. At time t11, the signal Pctn2 changes from Hi to Lo and storage of the noise component in the transfer capacitor 406a is ended.

At time t12, a signal Ptx(n+2) changes from Lo to Hi, the transfer transistors 202 on the (n+2)th row is turned on, the signal charges accumulated in the PD 201 on the (n+2)th row are transferred to the FD 206, amplified by the amplification transistor 204, and then converted into a voltage. Then, a voltage signal on the (n+2)th is output onto the first column signal line Vla.

Simultaneously, the signal Ptx(n+3) changes from Lo to Hi, the transfer transistor 202 on the (n+3)th row is turned on, the signal charges accumulated in the PD 201 on the (n+3)th row are transferred to the FD 206 simultaneously, amplified by the amplification transistor 204, and then converted into a voltage. Then, a voltage signal on the (n+3)th row is output onto the second column signal line Vlb.

At time t13, the signal Ptcs2 changes from Lo to Hi, the transfer transistor 407a is turned on, and the pixel signals output to the first and second column signal lines Vla and Vlb are stored in the transfer capacitors 405a in the first and second readout circuit 315a and 315b. At time t14, the signal Ptcs2 changes from Hi to Lo, the transfer transistor 407a is turned off, and storage of the pixel signals in the transfer capacitor 405a is ended.

In one horizontal scanning period afterward, the signal on the (n+2)th row is output from the output amplifier 302a, and the signal on the (n+3)th row is output from the output amplifier 302b simultaneously.

By sequentially repeating such operations for the respective rows included in the solid-state image sensor, the high-speed readout operation becomes possible even when reading out all the pixels.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-078980, filed Apr. 7, 2014 which is hereby incorporated by reference herein in its entirety.

What is claimed is:

1. A solid-state image sensor comprising:
a pixel array in which a plurality of pixels each including a photoelectric conversion portion, an amplification transistor which amplifies a signal corresponding to charges generated in the photoelectric conversion portion and a selection transistor which selectively outputs the signal corresponding to charges a arrayed in a row direction and a column direction, wherein color filters of different colors are arranged on each of the plurality of pixels which are arranged in each one pixel column;
a plurality of column signal lines which are arranged to each one pixel column and each of which is connected to a plurality of pixels having the color filter of same color in each one pixel column; and
a driver which drives the plurality of pixels to simultaneously turn on the selection transistors of at least two pixels having the color filters of same color on a same pixel column so as to perform signal output to a same column signal line from the at least two pixels having the color filter of the same color arrayed in the one pixel column and signal output to the plurality of column signal lines in each one pixel column in parallel in a case where a pixel combining readout mode is set.

2. The sensor according to claim 1, further comprising a first holding portion which holds a signal transferred from the pixel column via a first column signal line, a second holding portion which holds a signal transferred from the pixel column via a second column signal line, a first output amplifier which outputs the signal transferred from the first holding portion, and a second output amplifier which outputs the signal transferred from the second holding portion.

3. The sensor according to claim 2, wherein color filters in a Bayer arrangement are arranged on the: plurality of pixels, and the color filters each having a different color in the Bayer arrangement are arranged in the pixels output to the first column signal line and the second column signal line.

4. The sensor according to claim 1, further comprising:
a plurality of capacitors for each of the column signal lines, each capacitor holding signals output from a corresponding pixel portion.

5. The sensor according to claim 1, wherein the driver drives the plurality of pixels arrayed in the one pixel column to independently turn on selection transistors of each of the plurality of pixels on a same pixel column so as to perform signal output to one of the column signal lines from each of the plurality of pixels arrayed in the one pixel column in a case where a pixel independent readout mode is set.

6. An image capturing apparatus comprising:
a solid-state image sensor including a pixel array in which a plurality of pixels each including a photoelectric conversion portion, an amplification transistor which amplifies a signal corresponding to charges generated in the photoelectric conversion portion and a selection transistor which selectively outputs the signal corresponding to charges are arrayed in a row direction and a column direction, wherein color filters of different colors are arranged on each of the plurality of pixels which are arranged in each one pixel column, and a plurality of column signal lines which are arranged to each one pixel column and each of which is connected to a plurality of pixels having the color filter of same color in each one pixel column;
a mode switch which sets an image capturing mode; and
a controller which drives the plurality of pixels to simultaneously turn on the selection transistors of at least two pixels having the color filters of same color on a same pixel column so as to perform signal output to a same column signal line from the at least two pixels having the color filter of the same color arrayed in the one pixel column and signal output to the plurality of column signal lines in each one pixel column in parallel in a case where said mode switch sets a pixel combining readout mode.

7. The apparatus according to claim 6, wherein the solid-state image sensor further includes a first holding portion which holds a signal transferred from the pixel column via a first column signal line, a second holding portion which holds a signal transferred from the pixel column via a second column signal line, a first output amplifier which outputs the signal transferred from the first holding portion, and a second output amplifier which outputs the signal transferred from the second holding portion.

8. The apparatus according to claim 7, wherein color filters in a Bayer arrangement are arranged on the plurality of pixels, and the color filters each having a different color in the Bayer arrangement are arranged in the pixels output to the first column signal line and the second column signal line.

9. The apparatus according to claim 6, further comprising:
a plurality of capacitors for each of the column signal lines, each capacitor holding signals output from a, corresponding pixel portion.

10. The apparatus according to claim 6, wherein the controller control to drive the plurality of pixels arrayed in the one pixel column to independently turn on selection transistors of each of the plurality of pixels on a same pixel column so as to perform signal output one of the column signal lines from each of the plurality of pixels arrayed in the one pixel column in a case where a pixel independent readout mode is set.

11. A control method of an image capturing apparatus including a solid-state image sensor including a pixel array in which a plurality of pixels each including a photoelectric conversion portion, and an amplification transistor which amplifies a signal corresponding to charges generated in the photoelectric conversion portion and a selection transistor which selectively outputs the signal corresponding to charges are arrayed in a row direction and a column direction, wherein color filters of different colors are arranged on each of the plurality of pixels which are arranged in each one pixel column, and a plurality of column signal lines which are arranged to each one pixel column and each of which is connected to a plurality of pixels having the color filter of same color in each one pixel column, and a setting member which sets an image capturing mode, the method comprising:

driving the plurality of pixels to simultaneously turn on the selection transistors of at least two pixels having the color filters of same color on a same pixel column so as to perform signal output to a same column signal line from the at least two pixels having the color filter of the same color arrayed in the one pixel column and signal output to the plurality of column signal lines in each one pixel column in parallel in a case where the setting member sets a pixel combining readout mode.

12. A non-transitory computer-readable storage medium storing a program for causing a computer to execute a control method defined in claim 11.

13. The method according to claim 11, further comprising:

holding, in a plurality of capacitors, signals output from a corresponding pixel portion, the plurality of capacitors being configured for each of the column signal lines.

14. The method according to claim 11, wherein in the driving, the plurality of pixels arrayed in the one pixel column are driven to independently turn on selection transistors of each of the plurality of pixels on a same pixel column so as to perform signal output to one of the column signal lines from each of the plurality of pixels arrayed in the one pixel column in a case where a pixel independent readout mode is set.

* * * * *